(12) United States Patent
Tanaka et al.

(10) Patent No.: US 9,764,398 B2
(45) Date of Patent: Sep. 19, 2017

(54) HELICAL BLADE CUTTER

(71) Applicant: NAKATA MANUFACTURING CO., LTD., Osaka (JP)

(72) Inventors: Takahiro Tanaka, Osaka (JP); Satoshi Tsuruta, Osaka (JP); Yuzuru Kadono, Osaka (JP)

(73) Assignee: NAKATA MANUFACTURING CO., LTD., Osaka (JP)

( * ) Notice: Subject to any disclaimer, the term of this patent is extended or adjusted under 35 U.S.C. 154(b) by 175 days.

(21) Appl. No.: 14/780,812

(22) PCT Filed: Mar. 29, 2013

(86) PCT No.: PCT/JP2013/059607
§ 371 (c)(1),
(2) Date: Sep. 28, 2015

(87) PCT Pub. No.: WO2014/155698
PCT Pub. Date: Oct. 2, 2014

(65) Prior Publication Data
US 2016/0045962 A1    Feb. 18, 2016

(51) Int. Cl.
*B23C 5/22* (2006.01)
*B23C 3/12* (2006.01)
(Continued)

(52) U.S. Cl.
CPC .............. *B23C 5/2278* (2013.01); *B23C 3/12* (2013.01); *B23C 5/08* (2013.01); *B23C 5/20* (2013.01);
(Continued)

(58) Field of Classification Search
CPC .......... B23C 2200/16; B23C 2200/164; B23C 2200/165; B23C 2200/203;
(Continued)

(56) References Cited

U.S. PATENT DOCUMENTS 2,188,743 A    1/1940   Severson
2,207,909 A *  7/1940   Besaw ................... B23C 5/109
                                                  407/45
(Continued)

FOREIGN PATENT DOCUMENTS

JP    S61-288913 A    12/1986
JP    H08-47811 A     2/1996
(Continued)

OTHER PUBLICATIONS

Notification of Transmittal of Translation of the International Preliminary Report on Patentability; PCT/JP2013/059807 issued on Oct. 1, 2015.
(Continued)

*Primary Examiner* — Daniel Howell
*Assistant Examiner* — Nicole N Ramos
(74) *Attorney, Agent, or Firm* — Studebaker & Brackett PC

(57) ABSTRACT

A helical blade cutter including multiple linear blades attached to an outer circumferential surface of a round body having an outer surface formed into a cylindrical circumferential surface. The blades tilt to a given helix angle α from a straight line on the outer circumferential surface parallel to a rotational central axis O. Blade attachment surfaces are formed on the outer circumferential surface of the round body at given intervals in the circumferential direction. The blade attachment surfaces tilt to an angle same as the helix angle α of the blade while tilting to a rake angle β in a direction of an elevation angle from a tangent to the outer circumferential surface. The blades are each attached to a blade attachment part through intervention of a chip holder that allows detachment of the blade.

13 Claims, 14 Drawing Sheets

(51) Int. Cl.
*B23C 5/08* (2006.01)
*B23C 5/20* (2006.01)

(52) U.S. Cl.
CPC ........ *B23C 5/22* (2013.01); *B23C 2210/0485* (2013.01); *B23C 2210/168* (2013.01); *B23C 2270/16* (2013.01); *Y10T 407/1932* (2015.01)

(58) Field of Classification Search
CPC . B23C 2200/0416; B23C 5/109; B23C 5/207; B23C 5/22; B23C 9/00; B23C 2220/08; B23C 2210/56; Y10T 407/192; Y10T 407/1922; Y10T 407/1932; Y10T 407/1942; Y10T 407/1934
USPC ........................ 407/49, 41, 94, 40, 48, 46, 63
See application file for complete search history.

(56) References Cited

U.S. PATENT DOCUMENTS

| | | | | |
|---|---|---|---|---|
| 2,567,167 | A * | 9/1951 | Drader | B23F 21/166 |
| | | | | 407/25 |
| 3,672,017 | A * | 6/1972 | Nielsen | B23C 5/2265 |
| | | | | 407/49 |
| 3,785,417 | A | 1/1974 | Vora | |
| 4,074,737 | A | 2/1978 | Stewart | |
| 4,215,955 | A * | 8/1980 | Lillie | B23C 5/109 |
| | | | | 407/42 |
| 4,219,292 | A * | 8/1980 | Hoffmann | B23C 5/109 |
| | | | | 407/45 |
| 4,728,228 | A * | 3/1988 | Okunishi | B23C 5/207 |
| | | | | 407/35 |
| 5,044,570 | A * | 9/1991 | Montgomery, Sr. | B27L 11/005 |
| | | | | 144/230 |
| 5,533,840 | A * | 7/1996 | Reynolds | B23C 5/109 |
| | | | | 407/41 |
| 5,738,156 | A | 4/1998 | Stewart | |
| 6,997,650 | B2 * | 2/2006 | Voigt | B23C 5/2265 |
| | | | | 407/35 |
| 2007/0217873 | A1 * | 9/2007 | Martin | B23C 5/109 |
| | | | | 407/49 |
| 2007/0251601 | A1 | 11/2007 | Stager | |

FOREIGN PATENT DOCUMENTS

| | | |
|---|---|---|
| JP | H08-047811 A | 2/1996 |
| JP | 2006-281371 A | 10/2006 |
| JP | 2010-023143 A | 2/2010 |

OTHER PUBLICATIONS

International Search Report, PCT/JP2013/059607, Jun. 18, 2013.

* cited by examiner

Fig. 7
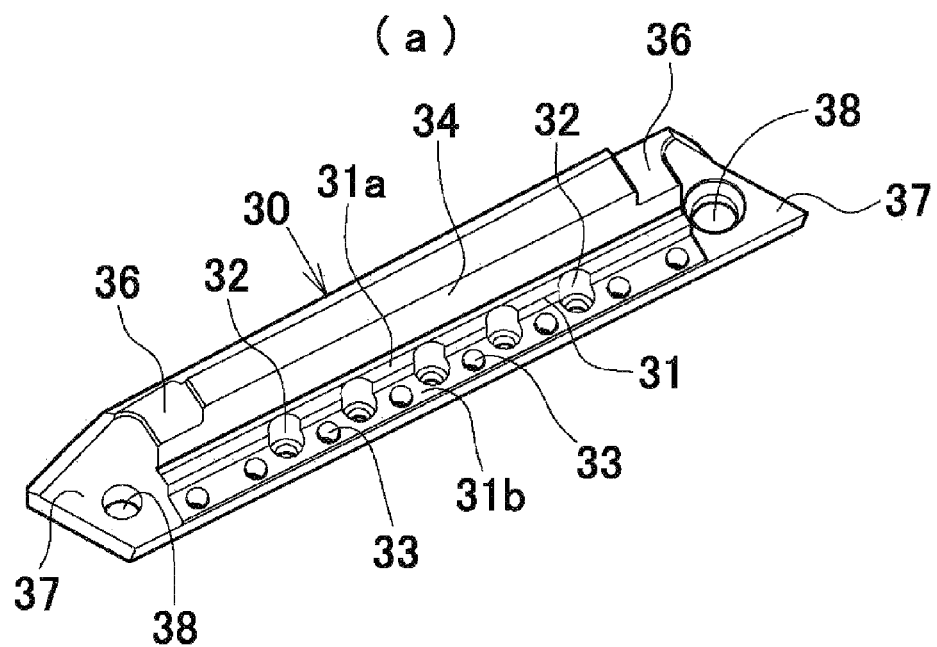
(a)
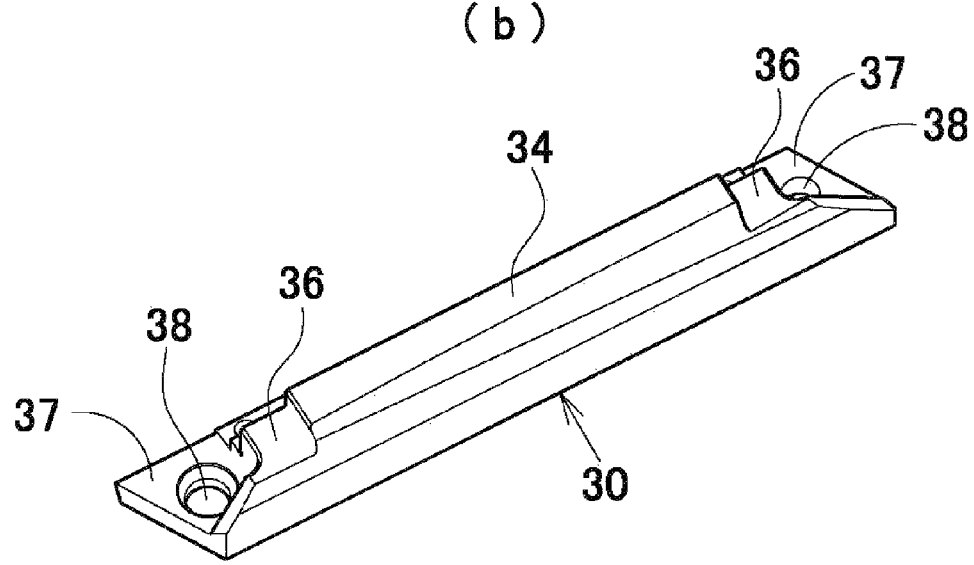
(b)

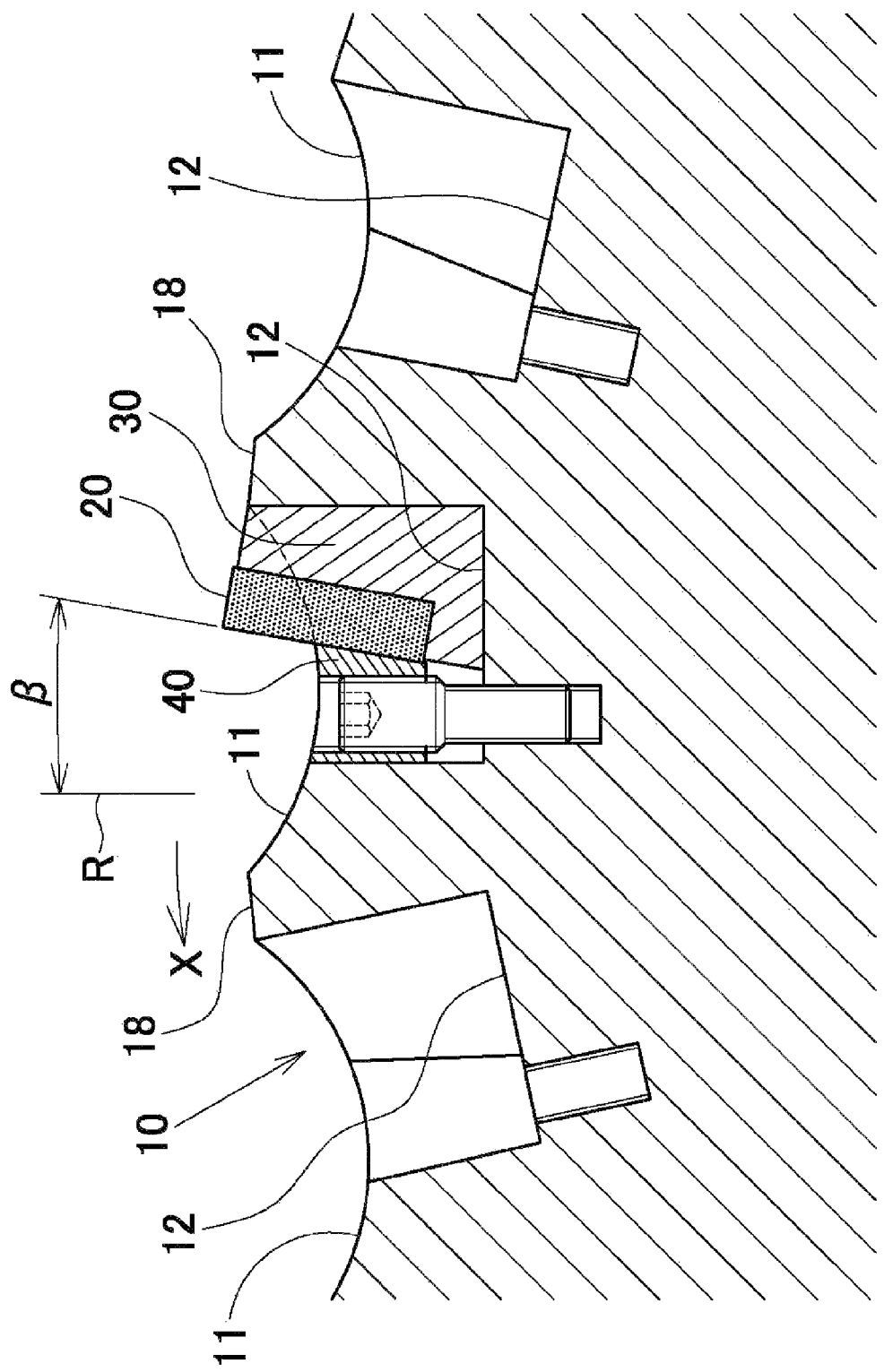

HELICAL BLADE CUTTER

TECHNICAL FIELD

This invention relates to a helical blade cutter used for edge trimming of a steel plate. This invention more specifically relates to a helical blade cutter provided with blades each formed of a chip line attached to an outer circumferential surface of a round body having an outer surface formed into a cylindrical circumferential surface and arranged at given intervals in a circumferential direction while tilting from a rotational central axis. The helical blade cutter is rotated with the rotational central axis tilting in a direction opposite a direction of the tilt of the blades.

BACKGROUND ART

In a manufacturing line for electric resistance welded pipes, a steel plate passes through a cutter called an edge trimmer for a uniform width of the steel plate and then enters a forming unit. Examples of such an edge trimmer include a helical blade cutter described in patent literature 1.

As shown in FIG. 13, the helical blade cutter is provided with multiple linear blades 20 attached to an outer circumferential surface of a round body 10 having an outer surface formed into a cylindrical circumferential surface and arranged at given intervals in a circumferential direction, specifically in a rotational direction X. Each blade 20 is formed by aligning multiple cutting chips 21 in a straight line from one end side toward an opposite end side of the round body 10 in a direction of a rotational central axis. Each blade 20 tilts back to an angle α from a straight line P on the outer circumferential surface parallel to the rotational central axis O to be behind the straight line P in the rotational direction X. The backward tilt angle α is called a helix angle α in an axial direction. The blade 20, a chip holder 30, and a wedge-shaped chip fixing member 40 are inserted and fixed together in each of multiple cuts 12 like slits that are formed diagonally in the outer circumferential surface of the round body 10 at a tilt angle same as the helix angle α.

More specifically, recessed arcuate surfaces 11 are formed in the outer circumferential surface of the round body 10 that tilt from the straight line P on the outer circumferential surface parallel to the rotational central axis O to an angle same as the helix angle α and arranged at given intervals in the circumferential direction. The cut 12 like a slit is formed to extend from a part between adjacent ones of the arcuate surfaces 11, 11 toward one of the arcuate surfaces 11 ahead of the other in the rotational direction. As shown in FIG. 14, the multiple cutting chips 21 forming the blade 20 and held by the chip holder 30 are fitted in each cut 12 substantially completely. Multiple wedge-shaped chip holding members 40 provided for the corresponding cutting chips 21 and fitted in each cut 12 in places ahead of these cutting chips 21 and the chip holder 30 in the rotational direction are screw fixed to the bottom surface of this cut 12, thereby fixing the multiple cutting chips 21 and the chip holder 30 together in the cut 12.

The linear blade 20 held in the cut 12 in the round body 10 tilts back to an angle β from a radial line R of the round body 10 to be behind the radial line R in the rotational direction X. The backward tilt angle β is called a rake angle β in a negative direction relative to the radial line R (hereinafter simply called a rake angle β). The backward tilt angle β is the same as a tilt angle in a direction of an elevation angle from a tangent T to the outer circumferential surface of the round body 10, specifically an elevation angle.

To form a swarf pocket, the upper surface of the wedge-shaped chip fixing member 40 is an arcuate surface continuous with the arcuate surface 11 of the round body 10.

For operation of the aforementioned helical blade cutter, the helical blade cutter is rotated with the rotational central axis tilting forward in a direction opposite the direction of the tilt of the blade 20. More specifically, the rotational central axis O tilts forward in a traveling direction of a steel strip to an angle γ approximate to the helix angle α. This makes the blade 20 tilting back in the traveling direction of the steel strip to the helix angle α abut on an edge of the steel strip with a slight backward tilt angle (α-γ) (see FIG. 4). The rotational direction X of the helical blade cutter is the same as a traveling direction Y of the steel strip. Further, the helical blade cutter is rotated at a speed higher than a traveling speed of the steel strip. As a result of this difference in speed, the edge of the steel strip is cut. The helix angle α and the rake angle β in the axial direction are requisites for cutting the edge at right angles and flattening the edge.

The helical blade cutter has many characteristics. Some of these characteristics are listed as follows. The blade 20 has the given helix angle α and rake angle β and abuts on an edge portion of the steel strip with backward tilt angles in two directions (angle (α-γ) and rake angle β). This achieves smooth sawing while controlling cutting to a relatively short distance. This reduces a load on each cutting chip 21 of the blade 20. Further, a cutting arc at the edge portion becomes an ellipse to reduce a maximum thickness of a swarf. The load on the cutting chip 21 is further reduced in this regard. With attention placed on one blade 20, a cutting position moves sequentially in a manner that depends on a cutting margin. This suppresses temperature increase of the cutting chip 21 to allow the multiple cutting chips 21 to wear uniformly. In this regard, reduction in the load on the cutting chip 21 can also be expected.

As described above, the helical blade cutter characteristically reduces a load on the blade 20 and a load on each cutting chip 21 forming the blade 20. However, using the helical blade cutter as the aforementioned edge trimmer brings the following problems.

The helical blade cutter is generally caused to follow displacement of a steel plate in a width direction by an edge portion detecting sensor or a copying machine so as to maintain contact between the blade 20 and an edge portion of the stele plate at a level substantially the same as an original cutting margin. If a rapid change in the circumstance of a material is caused, for example, if large camber of the steel plate occurs or the width of the steel plate changes, the edge portion of the steel plate may collide with the cutting chip 21 forming the blade 20. This might damage the cutting chip 21 or the chip holder 30.

A holder retainer 18 is provided behind the chip holder 30 in the rotational direction. The holder retainer 18 is located in a place between adjacent ones of the arcuate surfaces 11, 11. The holder retainer 18 is inherently thin for the presence of the cut 12. Additionally, for the presence of the arcuate surface 11 behind the holder retainer 18 in the rotational direction, the holder retainer 18 becomes thinner in response to approach toward its outer circumferential portion (tip portion). For this reason, damage on the chip holder 30 damages the holder retainer 18 easily. More specifically, the tip portion is broken and a base portion is bent.

The round body 10 is made of a material of high rigidity subjected to heat treatment such as quenching. Thus, the round body 10 cannot be repaired easily by means such as hardfacing and cannot undergo treatment easily for repairing the bend. For this reason, damage even on a part of the round body 10 inevitably necessitates disposal and exchange of the round body 10 in its entirety. The round body 10 entails high material cost. Additionally, the round body 10 involves complicated processing and entails extremely high processing cost for its three-dimensional shape with a large number of the arcuate surfaces 11 and a large number of the cuts 12 formed in the surface of the round body 10 and having tilts in two directions on the circumferential surface. The round body 10 further entails cost for subsequent heat treatment. For these reasons, the round body 10 is a considerably costly product so disposal and exchange of the round body 10 leads to a large economical loss.

If damage on the cutting chip 21 does not extend to the holder retainer 18 of the round body 10 but it damages only the cutting chip 21 or the chip holder 30, the cutting chip 21 or the chip holder 30 is to be exchanged. This exchange involves burdensome manual operation inside the cut 12 including detachment of the chip fixing member 40. Attaching the blade 20 for producing a new helical blade cutter is also burdensome operation as it should be done inside the cut 12.

PRIOR ART LITERATURE

Patent Literature

Patent Literature 1: Japanese Patent Application Publication No. Hei 8-47811

SUMMARY OF INVENTION

Problem to be Solved by Invention

It is an object of this invention to provide a helical blade cutter with excellent economical performance and excellent handling performance capable of minimizing an economical loss to be caused by damage on a blade, facilitating attachment and exchange of the blade, and reducing manufacturing cost.

Means of Solving Problem

As described above, the helical blade cutter for which this invention is intended considers the helix angle $\alpha$ and the rake angle $\beta$ in the axial direction of the round body to be important issues. An expected role of the round body to which the blade is to be attached is to determine these angles. Except for this role, the round body is simply an attachment base for the blade and merely a positioning member for the blade.

The present inventors paid attention to this role of the round body to which the blade is to be attached and made exceptional studies on a way of attachment of the blade to the round body. As a result of these studies, the present inventors reached a conclusion that an attachment part for the blade is not always required to be a combination of an arcuate groove and a cut but the attachment part can be produced sufficiently by a step structure including attachment surfaces each having a tilt in a direction of an elevation angle comparable to the helix angle $\alpha$ and the rake angle $\beta$ in the axial direction of the round body and arranged continuously in a circumferential direction through intervention of a step.

Specifically, forming the blade attachment surface given the helix angle $\alpha$ and the rake angle $\beta$ in the axial direction on the outer circumferential surface of the round body provides this blade attachment surface with a tilt in the direction of the elevation angle comparable to the rake angle $\beta$. This results in the formation of the step, thereby forming the outer circumferential surface of the round body into the step structure including the blade attachment surfaces arranged continuously in the circumferential direction through intervention of the step. The step mentioned herein basically results from the rake angle $\beta$ and is short in height. Further, as a result of a combination with the helix angle $\alpha$ in the axial direction, the height of the step changes from one end side toward an opposite end side of the round body in the axial direction. However, the step is still functional sufficiently for determining the position of a chip holder to retain the blade and preventing position shift of the chip holder. Thus, the step is found to provide an effective blade attachment part of an L shape in cross section if the step is used in combination with the blade attachment surface ahead of the step in a rotational direction.

The helical blade cutter of this invention has been completed based on the aforementioned knowledge. The helical blade cutter includes at least one linear blade attached to an outer circumferential surface of a round body having an outer surface formed into a cylindrical circumferential surface and rotated in a circumferential direction. The at least one blade tilts to a given helix angle $\alpha$ from a straight line on the outer circumferential surface parallel to a rotational central axis. A blade attachment surface is formed on the outer circumferential surface of the round body. The blade attachment surface tilts to an angle same as the helix angle $\alpha$ of the blade from the straight line P on the outer circumferential surface parallel to the rotational central axis O while tilting in a direction of an elevation angle from a tangent T to the outer circumferential surface. The blade attachment surface is formed through intervention of a step resulting from the tilt in the direction of the elevation angle. The blade is attached to a blade attachment part through intervention of a chip holder in a manner that allows detachment of the blade. The blade attachment part has an L shape in cross section resulting from being surrounded by the blade attachment surface and the step.

The linear blade generally includes a large number of linear blades arranged at given intervals in the circumferential direction of the outer circumferential surface of the round body. Alternatively, the linear blade may include one linear blade or a small number of linear blades such as two or three arranged at the given interval in the circumferential direction of the outer circumferential surface. The chip holder is fixed on the blade attachment surface on the outer circumferential surface of the round body. If the chip holder gets a shock transmitted through the multiple chips forming the blade, a turning moment is generated on the chip holder acting toward the back of the rotational direction. To resist this turning moment, it is preferable that the chip holder be screw fixed to the blade attachment surface at opposite side portions of the chip holder and screw fixed to the blade attachment surface in a part of the chip holder between the screw-fixed opposite side portions thereof and ahead of a line in a rotational direction connecting the screw-fixed opposite side portions.

Regarding each step, the height of the step changes continuously from one end side toward an opposite end side in a direction of the rotational central axis in response to the tilt from the straight line P on the outer circumferential surface parallel to the rotational central axis O of the round body.

The blade includes multiple cutting chips arranged in a straight line. The multiple cutting chips are housed in the chip holder fitted to the blade attachment part having the L shape in cross section resulting from being surrounded by the blade attachment surface and the step. The chip holder is screw fixed to the blade attachment surface.

Each of the multiple cutting chips in the chip holder is fixed in the chip holder with a corresponding wedge-shaped chip fixing member in a manner that allows detachment of the cutting chips. The chip fixing member is screw fixed to the chip holder in a place ahead of a corresponding one of the cutting chips in the rotational direction. The wedge-shaped chip fixing member is screw fixed not to the blade attachment surface on the outer circumferential surface of the round body but to the chip holder. This forms a unit including the blade, the chip holder, and the chip fixing member to achieve a rational structure of a chip cassette system.

Advantageous Effects of Invention

The helical blade cutter of this invention employs the short-height step structure using the tilt in the direction of the elevation angle from a tangent to the outer circumferential surface as a way of attaching the linear tilting blade to the outer circumferential surface of the round body having an outer surface formed into a cylindrical circumferential surface. This allows the blade to be fixed reliably in a given position. Further, damage to occur on the cutting chip forming the blade does not cause the danger of extension of the damage to the short-height step behind the damaged cutting chip. Thus, damage on the round body can be suppressed effectively. This can considerably reduce the frequency of exchange of the costly round body to achieve excellent economical performance. Additionally, forming the step on the outer circumferential surface of the round body is a simpler process than the process of forming a curved surface and a cut like a slit. This can reduce manufacturing cost for the round body itself. Excellent economical performance is also achieved in this regard. If the cutting chip is damaged, the damaged cutting chip should be exchanged. The cutting chip being exposed on the outer circumferential surface of the round body facilitates exchange of the damaged cutting chip. Additionally, the blade can be assembled easily during manufacture. In this way, the helical blade cutter of this invention achieves excellent handling performance in terms of assembling performance during manufacture and workability during repair, thereby contributing further to enhancement of economical performance.

BRIEF DESCRIPTION OF DRAWINGS

FIG. 7 is a perspective view showing the structure of a chip holder in detail used in the tilting blade.

FIG. 14 is a sectional view taken along an arrow line E-E of FIG. 13.

EMBODIMENT FOR CARRYING OUT INVENTION

Figure 1:
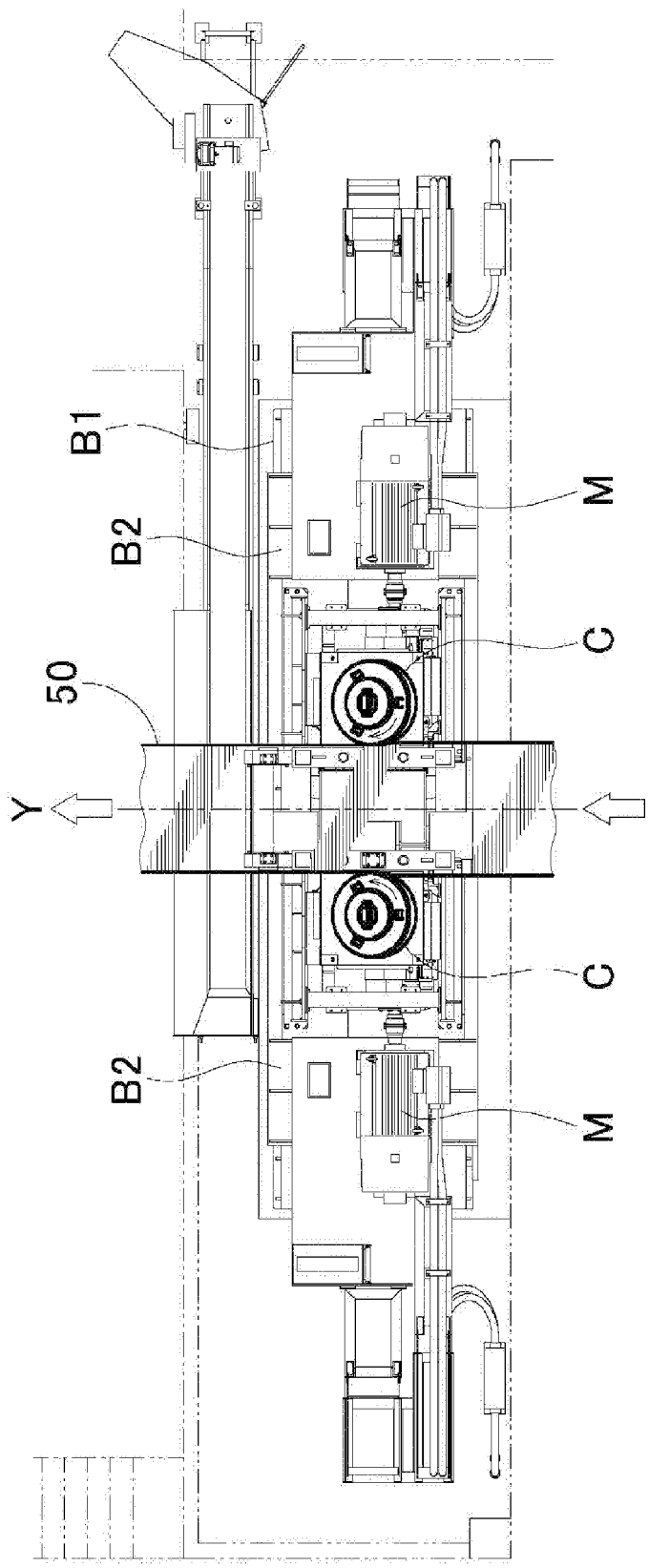
FIG. 1 is a plan view showing an outline of a helical mirror and explaining how a helical blade cutter showing an embodiment of this invention is used.
Figure 2:
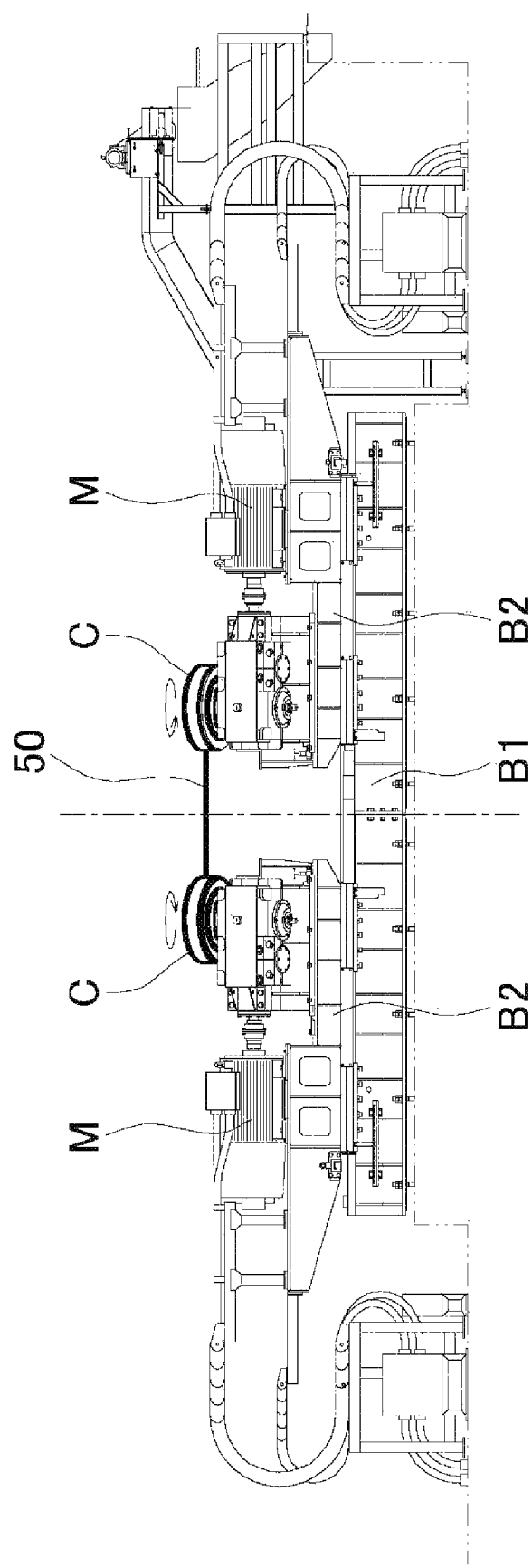
FIG. 2 is a back view showing the outline of the helical edge mirror.

An embodiment of this invention is described below. As shown in FIGS. 1 and 2, a helical blade cutter of this embodiment is installed on a helical mirror placed at an entrance of a manufacturing line for electric resistance welded pipes. The helical mirror is to trim opposite edges of a steel strip 50 to enter the manufacturing line for electric resistance welded pipes for the purpose of achieving a uniform width of the steel strip 50. The helical mirror includes helical blade cutters C, C as rotational cutters provided on opposite sides.

Figure 3:
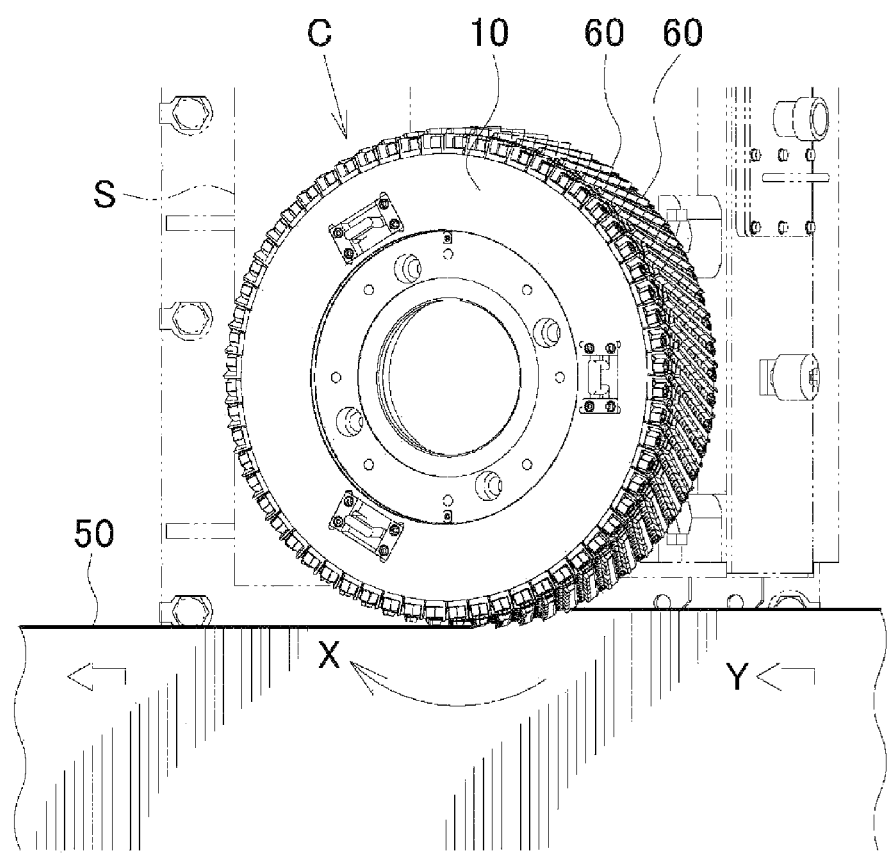
FIG. 3 is a plan view of the helical blade cutter of the helical edge mirror.
Figure 4:
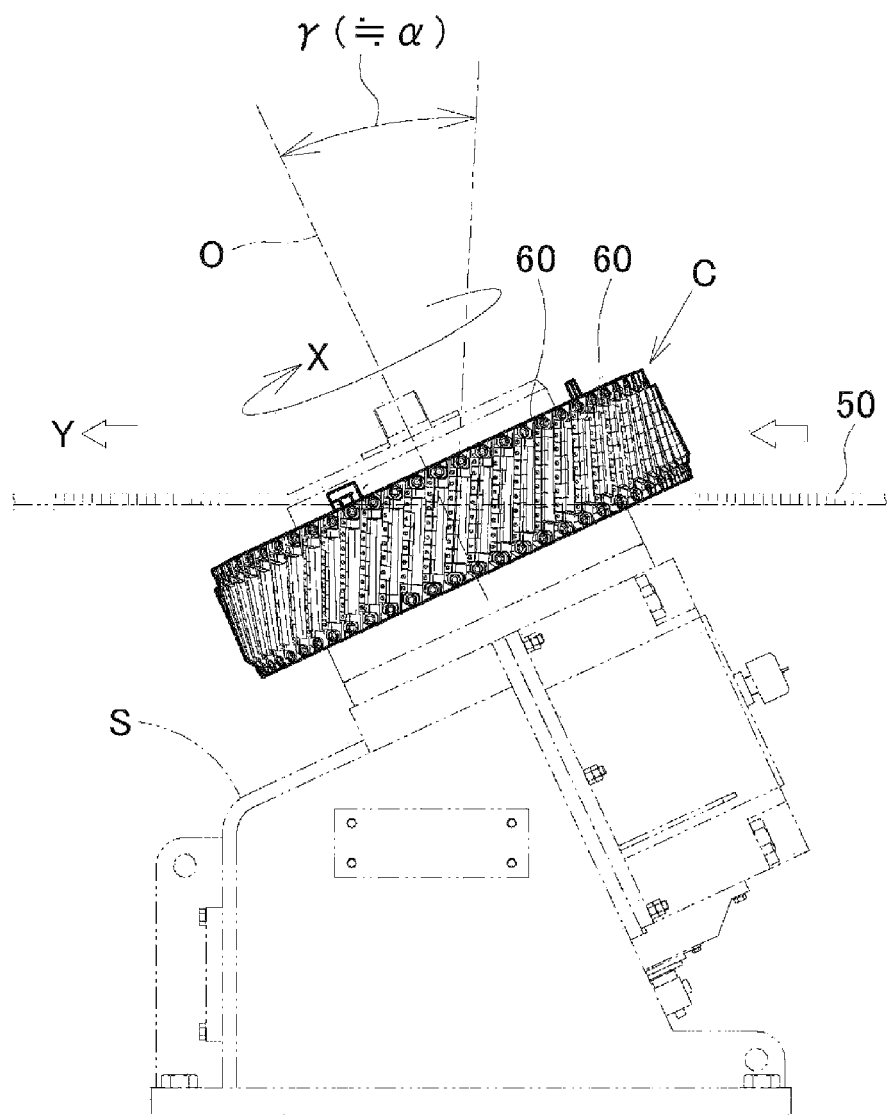
FIG. 4 is a side view of the helical blade cutter.

The helical mirror includes a horizontal fixed base B1 and movable bases B2, B2 provided on opposite sides of the fixed base B1 in a manner such that the movable bases B2, B2 can make traverse motion freely with a traveling line for the steel strip 50 placed between the movable bases B2, B2. The movable bases B2, B2 on the opposite sides is caused to make traverse motion by a driving mechanism of a screw system not shown in the drawings. As shown in FIGS. 3 and 4, the helical blade cutter C is supported by a support S on the corresponding movable base B2 in a manner such that the helical blade cutter C is located in a posture tilting forward in a traveling direction of the steel strip 50 and the helical blade cutter C can rotate freely. The helical blade cutter C is rotated in the same direction as the traveling direction of the steel strip 50 by a motor M placed lateral to the support S and on the movable base B2.

For grinding, the steel strip 50 passes through between the rotating helical blade cutters C, C on the opposite sides while being supported in a horizontal state by various guides not shown in the drawings. The helical blade cutters C, C on the opposite sides are rotated at a circumferential speed higher than a traveling speed of the steel strip 50, thereby trimming opposite edges of the steel strip 50 with the helical blade cutters C, C on the opposite sides. Causing the movable bases B2, B2 on the opposite sides to make traverse motion achieves the following. First, a gap between the helical blade cutters C, C on the opposite sides is controlled to determine the width of the steel strip 50 after the cutting. Second, the movable bases B2, B2 on the opposite sides are driven in synchronous with each other in response to displacement of the traveling steel strip 50 such as meandering motion in the direction of the width, thereby making the helical blade cutters C, C on the opposite sides follow this displacement.

Figure 8:
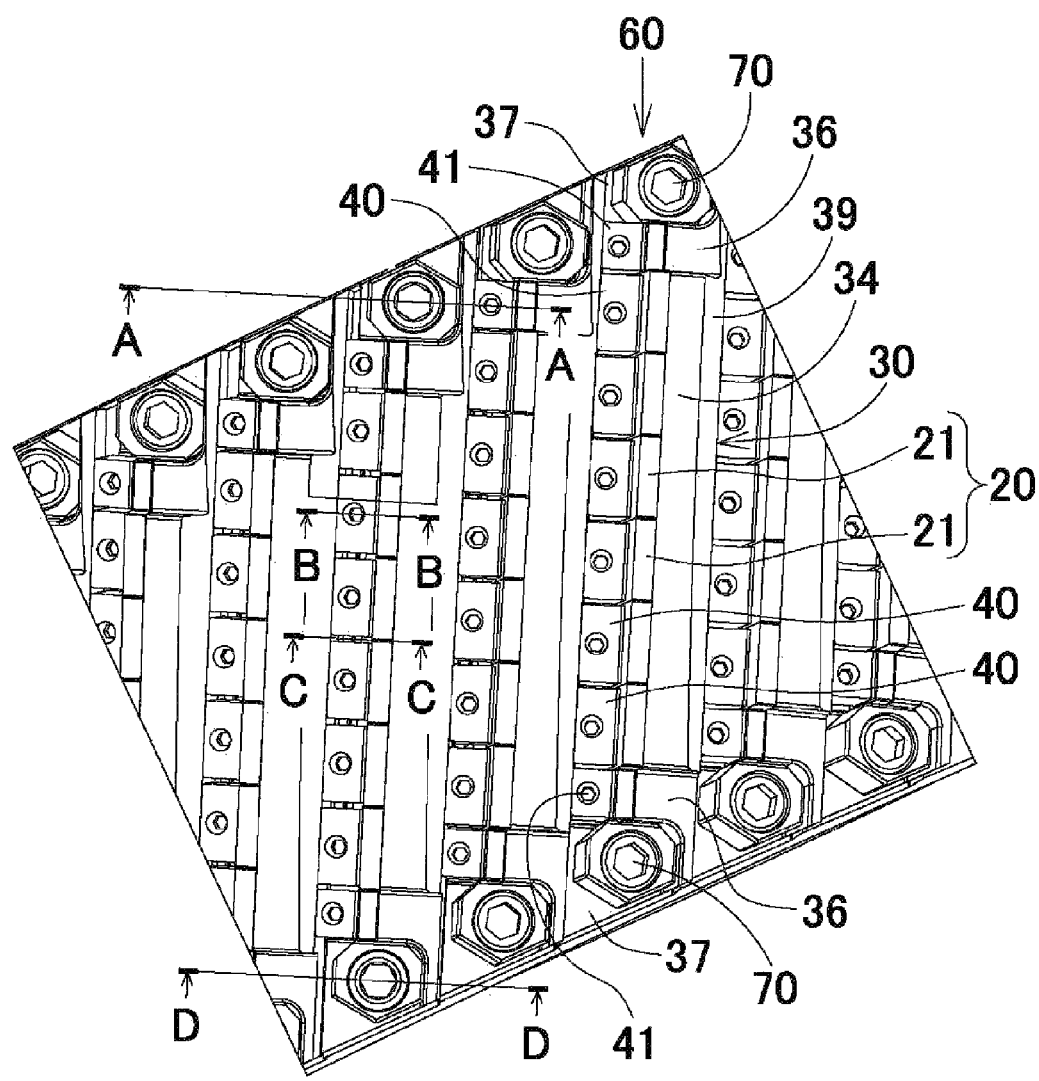
FIG. 8 is a side view showing a part of the helical blade cutter in an enlarged manner.
Figure 9:
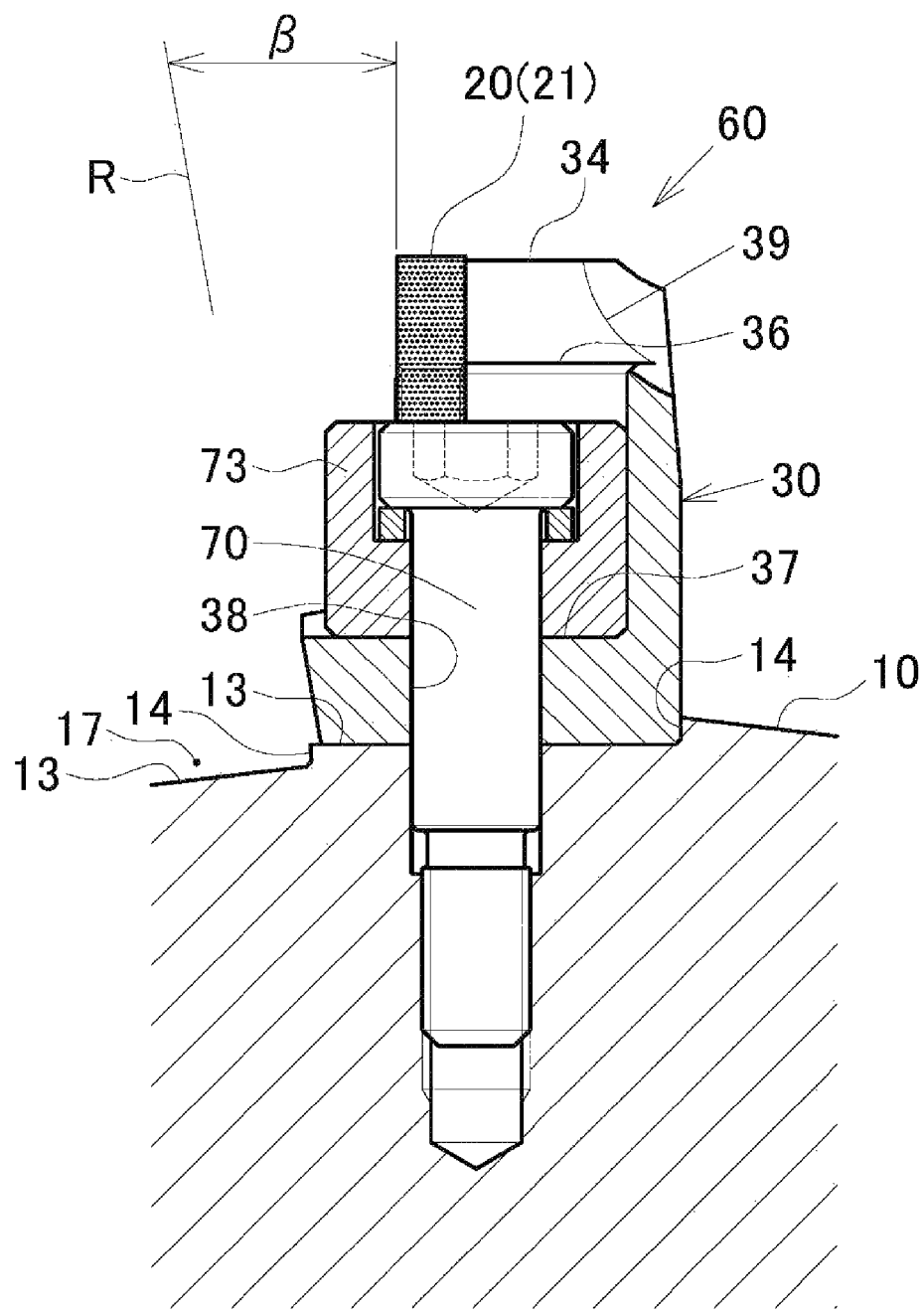
FIG. 9 is a sectional view taken along an arrow line A-A of FIG. 8.
Figure 10:
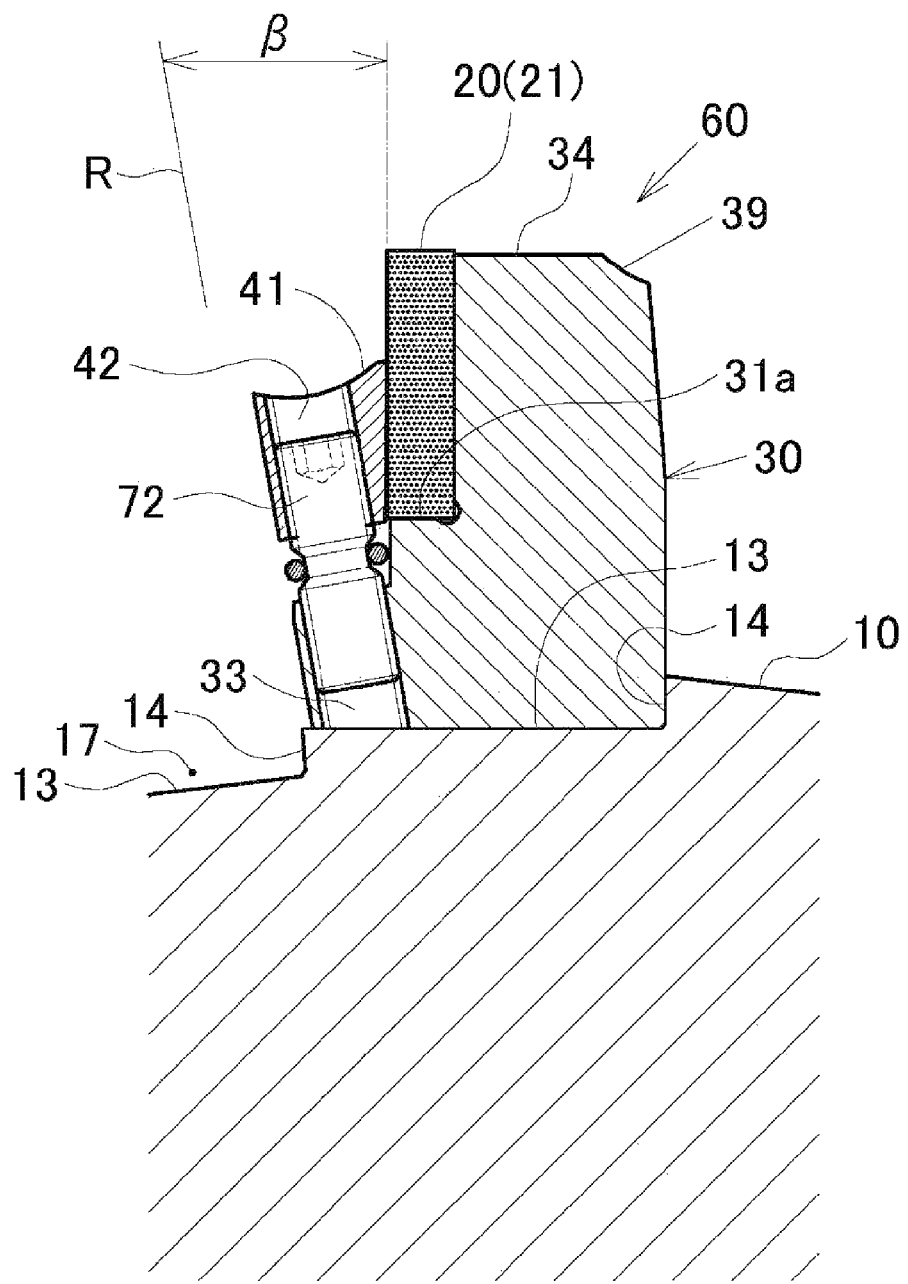
FIG. 10 is a sectional view taken along an arrow line B-B of FIG. 8.
Figure 11:
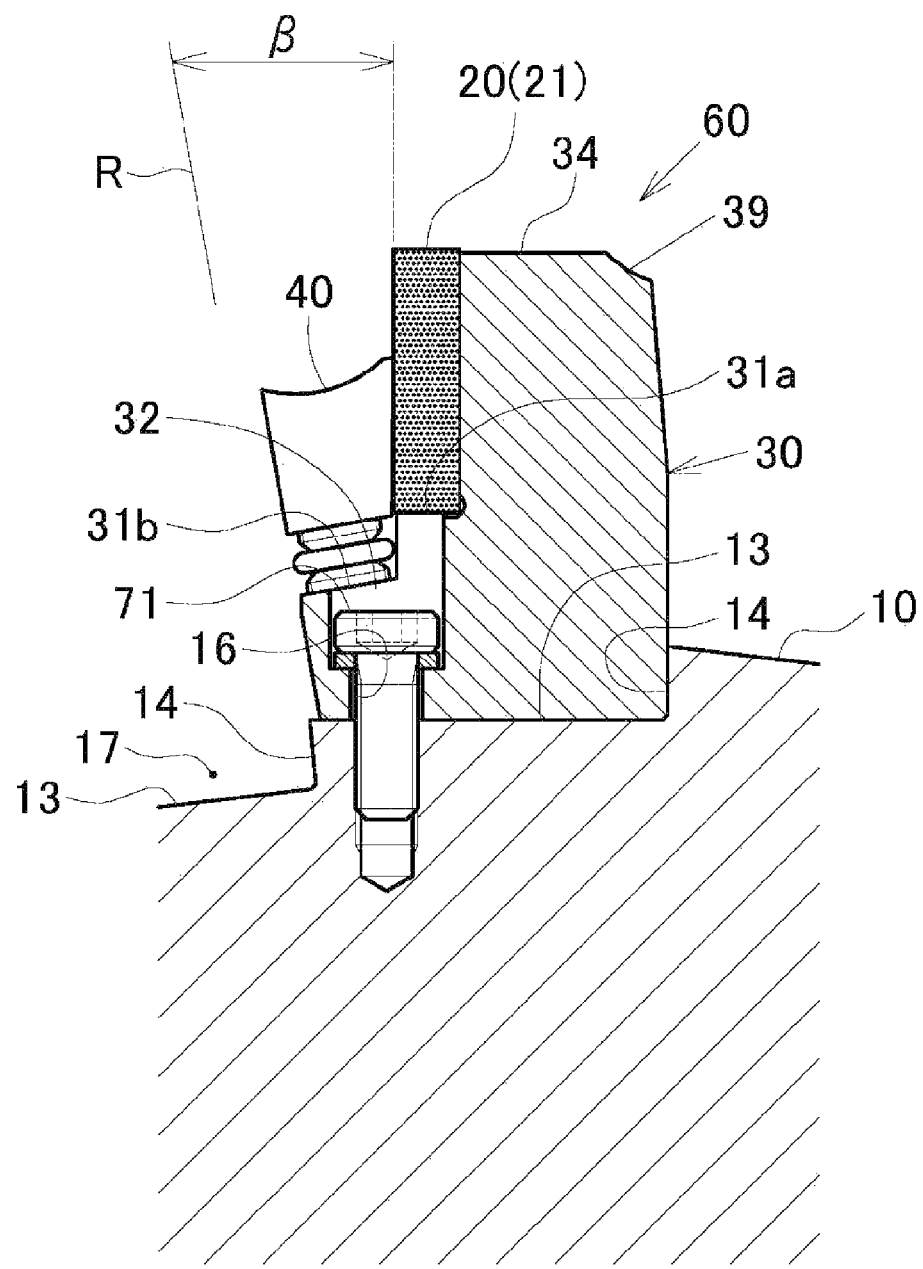
FIG. 11 is a sectional view taken along an arrow line C-C of FIG. 8.
Figure 12:
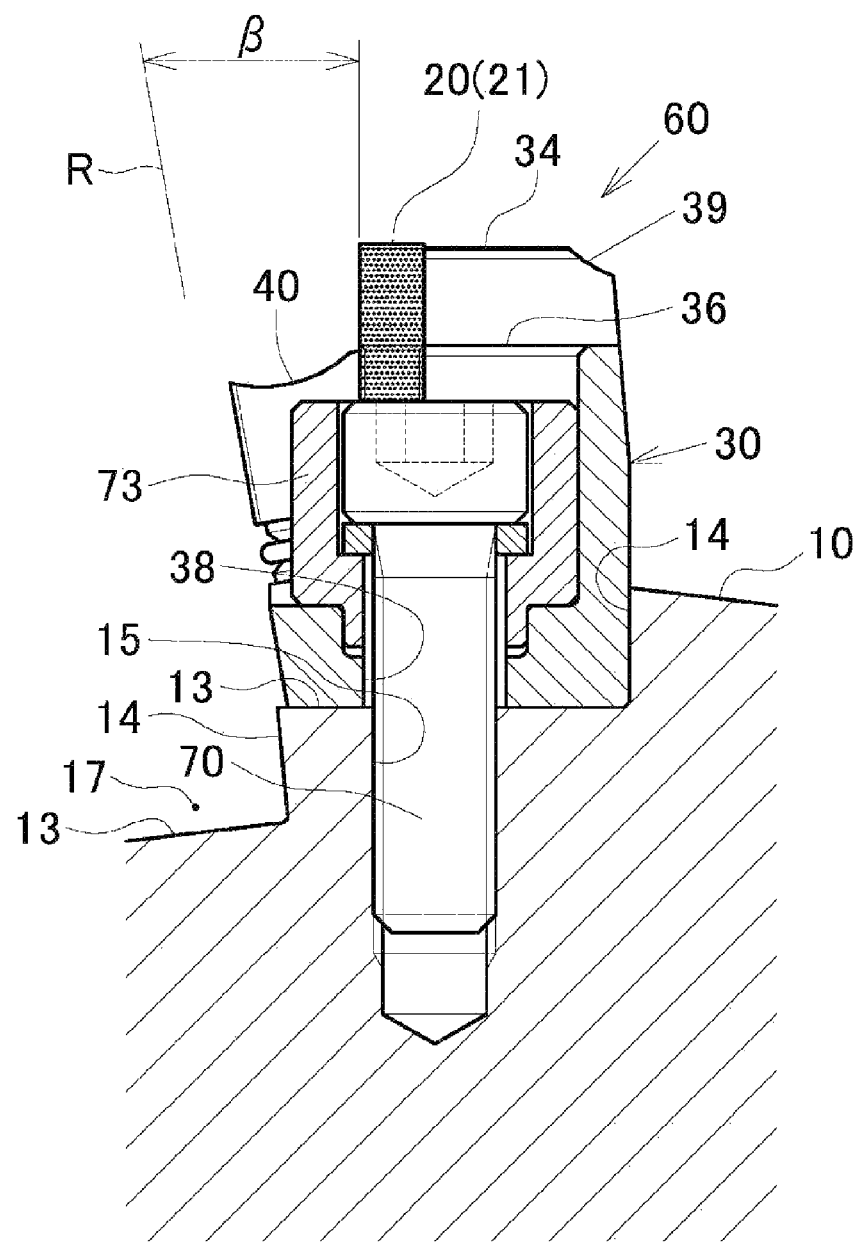
FIG. 12 is a sectional view taken along an arrow line D-D of FIG. 8.
Figure 13:
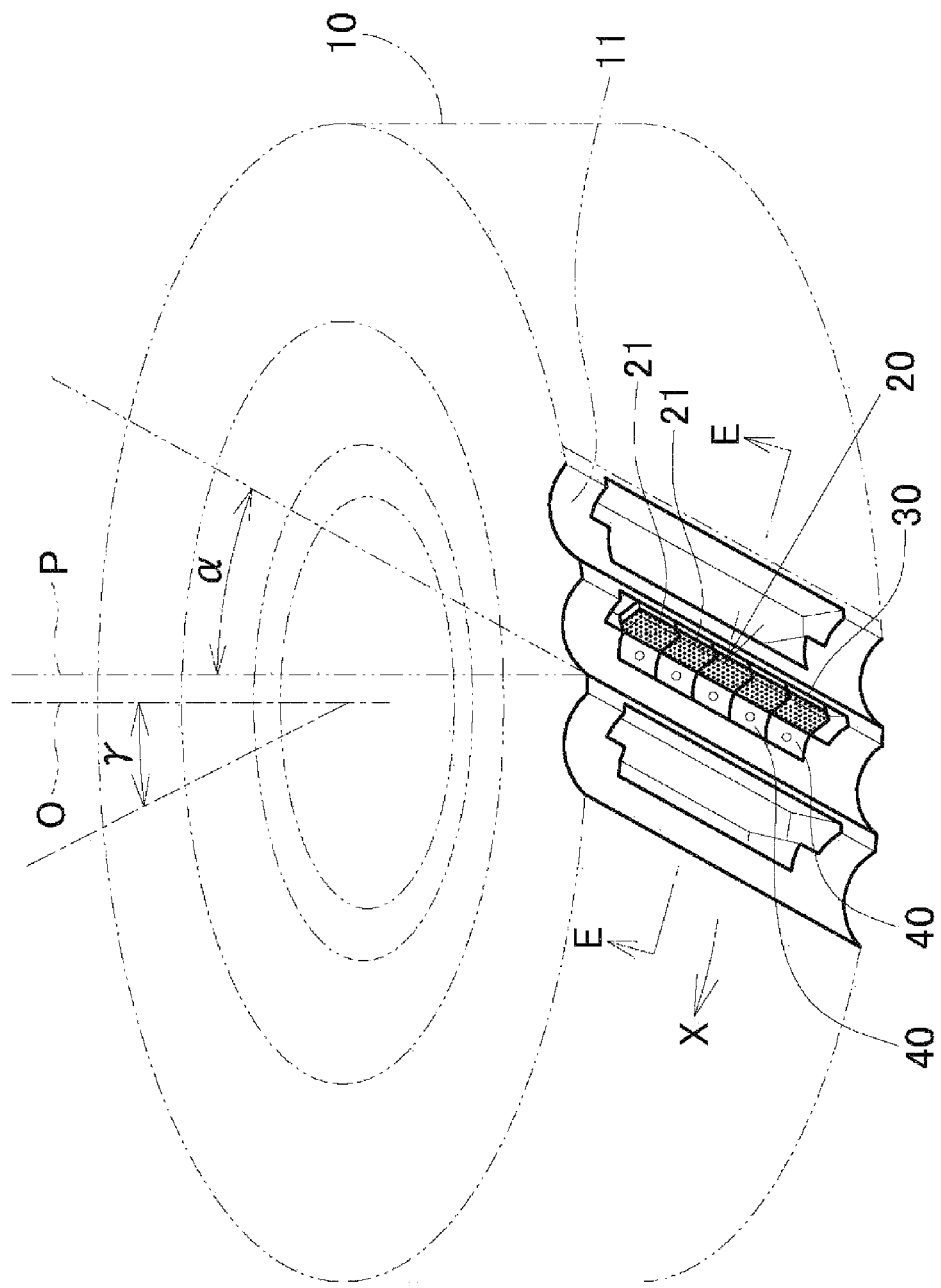
FIG. 13 is a schematic side view of a conventional helical blade cutter.

The outline of the helical mirror using the helical blade cutter of this embodiment is as described above. The following describes the structure of the helical blade cutter of this embodiment in detail by referring to the perspective views of FIGS. 5 to 7, the partially enlarged side view of FIG. 8, and the sectional views of FIGS. 9 to 12.

Figure 5:
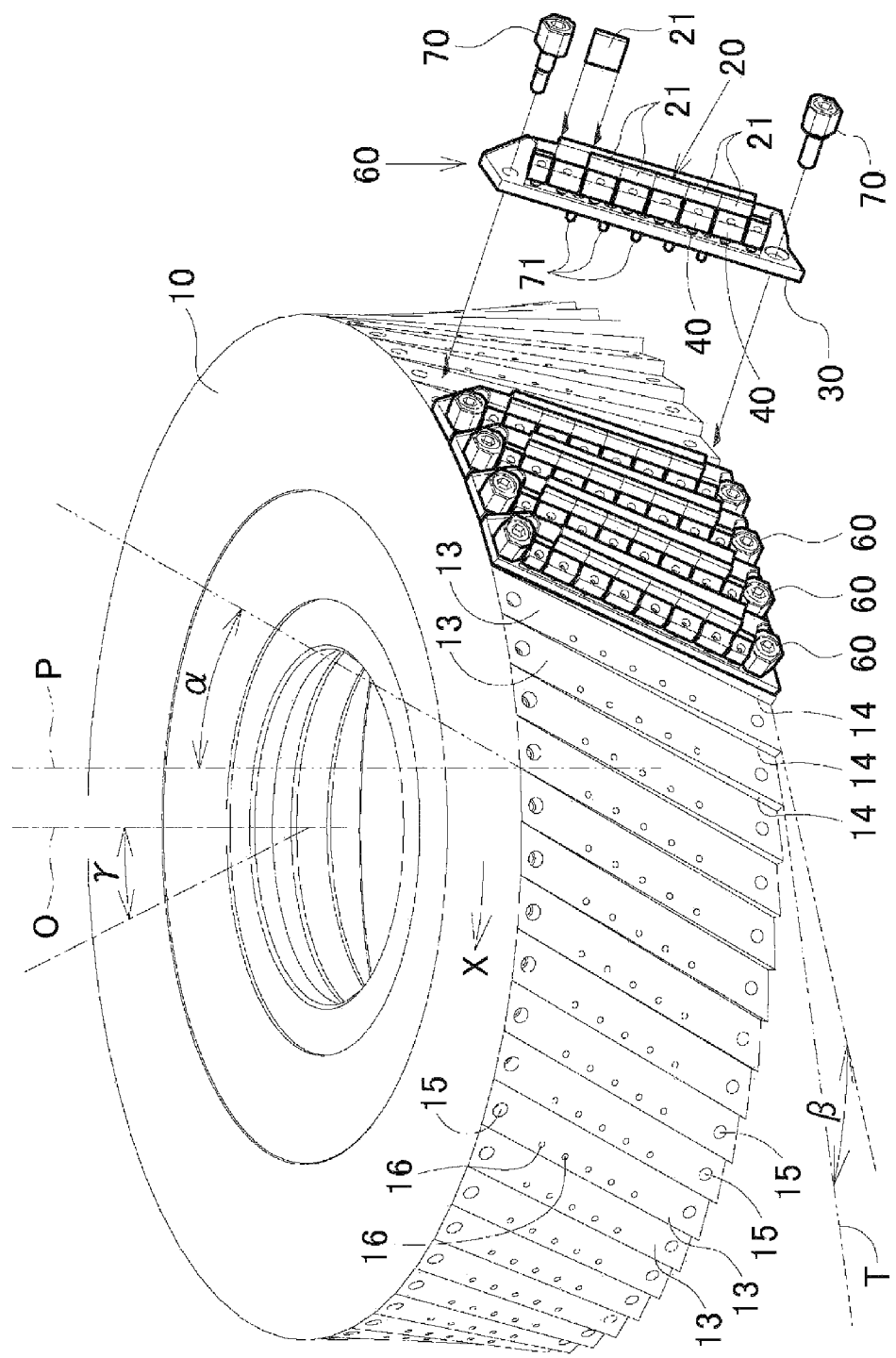
FIG. 5 is a perspective view showing the structure of an outer circumferential part of the helical blade cutter in detail forming a principal part of the helical blade cutter.
Figure 6:
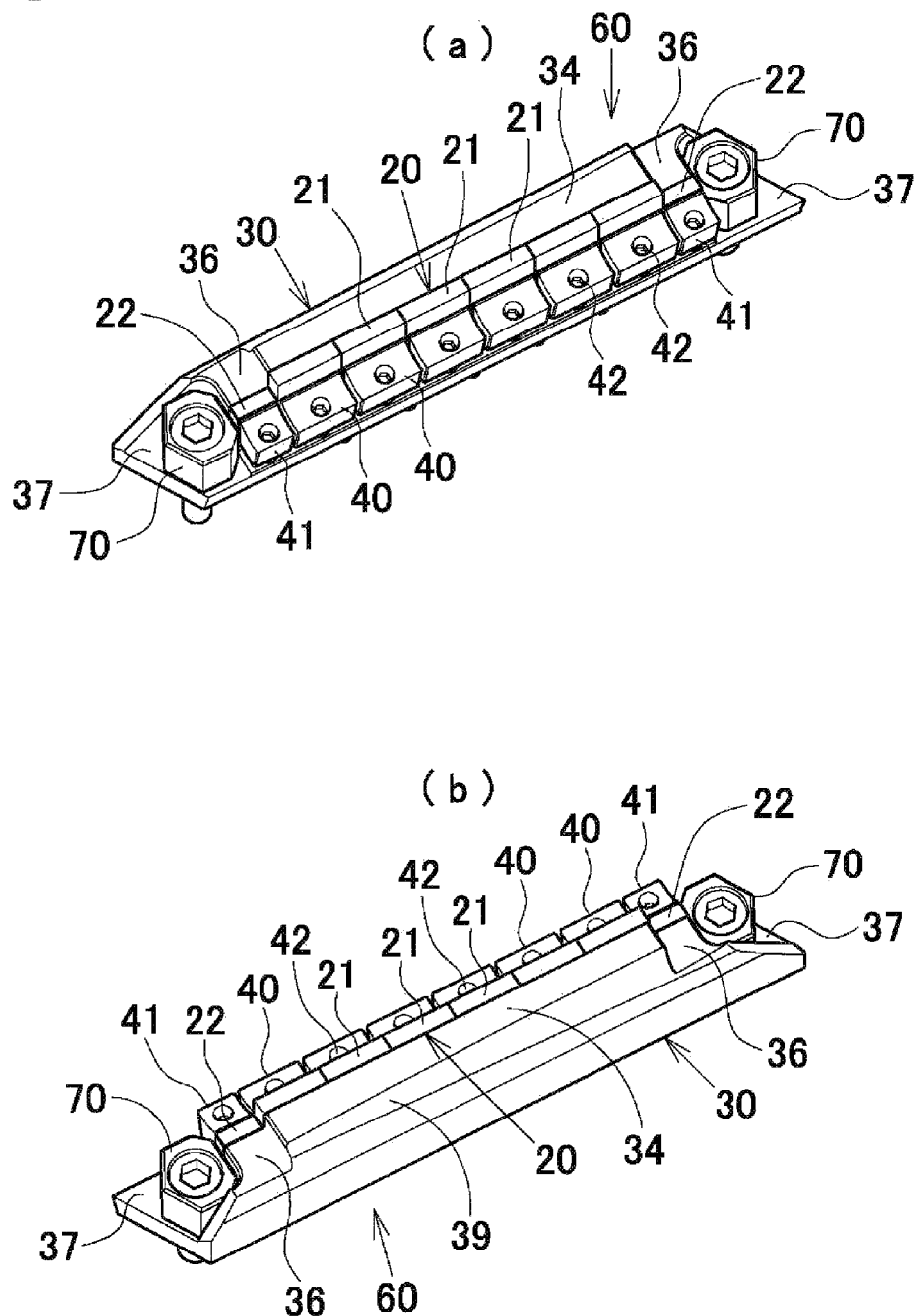
FIG. 6 is a perspective view showing the structure of a tilting blade in detail used in the helical blade cutter.

As shown in FIG. 5, the helical blade cutter of this embodiment includes a round body 10 having an outer surface formed into a cylindrical circumferential surface and blade units 60 fixedly arranged on this outer circumferential surface at given intervals in a circumferential direction. As will be described in detail later, the blade unit 60 employs a chip cassette system where multiple cutting chips 21 forming a blade 20 are fixed in a chip holder 30 of an L-shape in cross section with multiple wedge-shaped chip fixing members 40 provided for the corresponding cutting chips 21. The blade 20 tilts back from a straight line P on the outer circumferential surface parallel to a rotational central axis O so as to have a given helix angle α.

The round body 10 is a cylindrical body having an open driving side (lower surface side) and a non-driving side (upper surface side) functioning as an annular attachment part. A large number of blade attachment surfaces 13 to which the blade units 60 are to be screw fixed are formed on the outer circumferential surface of the round body 10. The blade attachment surfaces 13 are provided for the corresponding blade units 60. Each blade attachment surface 13 is an elongated strip-shaped plane extending from the non-driving side (upper side) corresponding to one end side of the round body 10 in a direction of the rotational central axis to the driving side (lower side) corresponding to an opposite end side while maintaining the same width. The blade attachment surface 13 tilts back from the straight line P on the outer circumferential surface parallel to the rotational central axis O to an angle α corresponding to the helix angle α of the blade 20 to be behind the straight line P in a rotational direction X.

As a result of this tilt, each blade attachment surface 13 becomes a parallelogram having opposite ends in the longitudinal direction that tilt in conformity with an outer circumferential circle on opposite ends of the round body 10 in an axial direction.

Further, each blade attachment surface 13, viewed in the rotational direction X of the round body 10, tilts to an angle β in a direction of an elevation angle of the blade 20 from a tangent T to the outer circumferential surface of the round body 10 (a direction pointing upward toward the front of the rotational direction X). The tilt angle β provides the blade 20 with a backward tilt angle relative to a radial line R of the round body 10, specifically a rake angle β (see FIGS. 8 to 12). The presence of the tilt angle β in the direction of the elevation angle provided to a large number of the blade attachment surfaces 13 forms a step 14 between adjacent ones of the blade attachment surfaces 13, 13. Each step 14 and the blade attachment surface 13 ahead of this step 14 in the rotational direction cross each other at right angles. A blade attachment part 17 of an L shape in cross section to house the blade unit 60 is formed in a region surrounded by this step 14 and this blade attachment surface 13 (see FIGS. 9 to 12).

The blade attachment surface 13 has a tilt corresponding to the helix angle α of the blade 20 in the axial direction. This makes the step 14 become higher gradually from the non-driving side (upper side) toward the driving side (lower side) of the round body 10.

The blade attachment surface 13 is provided with first screw holes 15 and second screw holes 16 for fixation of the blade unit 60, particularly of the chip holder 30. The first screw holes 15 are arranged at opposite end portions of the blade attachment surface 13 in the longitudinal direction (opposite side portions as viewed in a direction toward the front of the rotational direction). The second screw holes 16 are arranged at given intervals along a line ahead of a line in the rotational direction connecting the first screw holes 15, 15 on the opposite sides.

As shown in detail in FIGS. 6(a) and (b) and FIGS. 8 to 12, the blade unit 60 to be attached to the blade attachment surface 13 includes the chip holder 30 and the multiple wedge-shaped chip fixing members 40. The chip holder 30 is fitted to the blade attachment part 17 on the blade attachment surface 13 and screw fixed to the blade attachment part 17 for holding the linear blade 20 on the outer circumferential surface of the round body 10. The chip fixing members 40 are screw fixed to the chip holder 30 for holding the blade 20 fixedly in the chip holder 30.

As shown in detail in FIGS. 7(a) and (b) and FIGS. 9 to 12, the chip holder 30 is a horizontally-long metal block conforming to the strip-shaped blade attachment surface 13 of the round body 10. The chip holder 30 has a blade housing 31 of an L shape in cross section formed in a portion of the chip holder 30 except lateral end portions on opposite sides. The blade housing 31 is opened toward the front of the rotational direction of the round body 10. The blade housing 31 has an upper surface at the bottom and a front surface at the back perpendicular to each other.

The upper surface at the bottom of the blade housing 31 is formed into two layers. A place on a tall first layer portion 31a located behind in the rotational direction functions as a housing for originally housing a blade. A place on a short second layer portion 31b located ahead in the rotational direction functions as a housing for the chip fixing member 40. The bottom of the blade housing 31 is provided with multiple first through holes 32 arranged at given intervals in a breadth direction for screw fixation of the corresponding chip holder 30 to the blade attachment surface 13 of the round body 10. The bottom of the blade housing 31 is further provided with multiple third screw holes 33 for screw fixation of the multiple chip fixing members 40 in the blade housing 31. The third screw holes 33 are provided in positions where corresponding ones of the multiple chip fixing members 40 are to be fixed and where the third screw holes 33 do not overlap the first through holes 32.

The back of the blade housing 31 except for opposite lateral end portions thereof functions as a thick blade retainer 34 for retaining the blade 20. The height of the blade retainer 34 is determined to be the same as the height of the blade 20. The opposite lateral end portions of the blade housing 31 function as spacer housings for housing short-height chip-like spacers 22 used for determining the position of the blade 20 in a lateral direction. Spacer retainers 36 are provided at the back of the spacer housings. The spacer retainers 36 are shorter in height than the blade retainer 34 so as to conform to the height of the chip-like spacers 22.

The lateral end portions on the opposite sides of the chip holder 30 function as plate-like screw fixing parts 37, 37. The screw fixing parts 37, 37 are substantially the same in thickness as the bottom of the blade housing 31. The screw fixing parts 37, 37 are provided with second through holes 38, 38 for screw fixation of the corresponding chip holder 30 to the blade attachment surface 13 of the round body 10. A line connecting the respective centers of the second through holes 38, 38 is located behind a line in the rotational direction along which the first through holes 32 are arranged so as to conform to the positions of the first screw holes 15 and those of the second screw holes 16 relative to each other in the blade attachment surface 13.

The bottom surface of the chip holder 30 is flat throughout the width (entire length in the longitudinal direction) and is perpendicular to the back surface of the chip holder 30 also formed of a flat surface. Opposite lateral surfaces of the chip holder 30 tilt so as to make this chip holder 30 conform to the outer circumferential surface of the round body 10 on the opposite end sides in the axial direction. Thus, in a strict sense, the strip-shaped blade attachment surface 13 and the bottom surface of the chip holder 30 to abut on this blade attachment surface 13 are both parallelograms.

The blade 20 is formed of multiple (here, six) cutting chips 21 aligned laterally. All the multiple cutting chips 21 are equally formed into a thin rectangular parallelepiped. These cutting chips 21 and the short-height chip-like spacers 22, 22 on opposite sides of the cutting chips 21 are aligned together on the bottom of the blade housing 31 of the chip holder 30, particularly on the first layer portion 31a. In this condition, the wedge-shaped chip fixing members 40 and narrow chip fixing members 41, 41 for the chip-like spacers 22, 22 are inserted for corresponding chip members into a place ahead of the chip line, specifically between the chip line and the blade retainer 34 of the chip holder 30 ahead of this chip line in the rotational direction. Then, the chip fixing members 40 and the chip fixing members 41, 41 are screw fixed on the bottom, particularly on the second layer portion 31b of the blade housing 31 of the chip holder 30. As a result, the blade 20 formed of the cutting chip line and the chip-like spacers 22, 22 on the opposite sides of the blade 20 are fixed together in given positions (on the first layer portion 31a) in the blade housing 31.

Regarding screw fixation of the chip fixing members 40 and the chip fixing members 41, each of these chip fixing members is provided with a third through hole 42 for an attachment screw 72.

The fixing members 40 and the fixing members 41 located ahead of the blade 20 in the rotational direction have upper surfaces shorter in height than the upper surfaces of the cutting chips 21 and formed like downwardly sloping curved surfaces in order to form a pocket for a swarf caused by cutting with the blade 20. Further, a chamfered part 39 formed of a downwardly sloping curved surface is formed in an upper part of a place behind the blade retainer 34 in the rotational direction that is located behind the blade 20 in the rotational direction. The chamfered part 39 is designed in a manner such that while the chip holder 30 is fixed to the blade attachment surface 13, the chamfered part 39 becomes deeper gradually from the driving side (lower side) toward the non-driving side (upper side) of the round body 10. The chamfered part 39 becomes continuous with the curved upper surface of the fixing member 40 and that of the fixing member 41 at an end portion of the round body 10 on the non-driving side (upper side), thereby forming a complete swarf pocket.

A method of attaching the blade unit 60 to the blade attachment surface 13 of the round body 10 is described next.

The chip holder 30 is attached to the blade attachment surface 13 of the round body 10. More specifically, the chip holder 30 is placed on the blade attachment surface 13 of the round body 10. Then, attachment screws 70, 70 are passed through the second through holes 38, 38 provided in the opposite lateral end portions of the chip holder 30 and inserted into the first screw holes 15, 15 formed in the opposite end portions of the blade attachment surface 13. Collars 73 are combined with the attachment screws 70, 70. Further, multiple attachment screws 71 are passed through the multiple first through holes 32 formed in the bottom of the blade housing 31 and inserted into the multiple second screw holes 16 formed in a central portion of the blade attachment surface 13. These processes are repeated to fix the chip holders 30 to all the blade attachment surfaces 13 of the round body 10.

After the chip holders 30 are fixed to all the blade attachment surfaces 13, the cutting chips 21 of a predetermined number are aligned in the blade housing 31 of the chip holder 30. The short-height chip-like spacers 22 are located in the spacer housings on the opposite sides of the blade housing 31. In this condition, the wedge-shaped chip fixing member 40 is pushed into a place ahead of each cutting chip 21, more specifically, between each cutting chip 21 and the blade retainer 34 of the chip holder 30 fixed to the blade attachment surface 13 ahead of this cutting chip 21 in the rotational direction. Further, the chip fixing members 41, 41, also of a wedge-shape, are pushed into places ahead of the chip-like spacers 22, 22 on the opposite sides of the cutting chips 21, more specifically, between the chip-like spacers 22, 22 on the opposite sides and the spacer retainers 36, 36 on the opposite sides ahead of these chip-like spacers 22, 22 in the rotational direction. Then, the attachment screws 72 are passed through the third through holes 42 in the chip fixing members 40 and those in the chip fixing members 41 and inserted into the third screw holes 33 formed in the bottom of the blade housing 31.

In this way, the wedge-shaped chip fixing members 40 are press fitted into the places between the cutting chips 21 and the blade retainer 34 of the chip holder 30 ahead of these cutting chips 21 in the rotational direction. Further, the chip fixing members 41, 41, also of a wedge-shape, are press fitted into the places between the chip-like spacers 22, 22 on the opposite sides of the cutting chips 21 and the spacer retainers 36, 36 ahead of these chip-like spacers 22, 22 in the rotational direction. As a result, the multiple cutting chips 21 forming the blade 20 are fixed between the multiple chip fixing members 40 ahead of these cutting chips 21 in the rotational direction and the blade retainer 34 behind these cutting chips 21 in the rotational direction. Likewise, the chip-like spacers 22, 22 on the opposite sides of the blade 20 are fixed between the multiple chip fixing members 41, 41 ahead of these spacers 22 in the rotational direction and the spacer retainers 36, 36 behind these spacers 22 in the rotational direction.

Performing the aforementioned operation on all the chip holders 30 fixed on the outer circumferential surface of the round body 10 completes attachment of all the blade units 60 and attachment of all the blades 20 to all the blade attachment blades 17 on this outer circumferential surface. In this way, the helical blade cutter C is completed. All the blades 20 of the helical blade cutter C have the helix angle $\alpha$ and the rake angle $\beta$ in the axial direction of the round body 10. As described above, for actual edge grinding of the steel strip 50, the helical blade cutters C are supported on opposite sides of a traveling line for the steel strip 50 in a manner such that the helical blade cutters C are located in a posture tilting forward to an angle $\gamma$ in a traveling direction of the steel strip 50 and can rotate freely. The helical blade cutters C are rotated in the same direction as the traveling direction of the steel strip 50.

The rotational central axis O of the helical blade cutter C tilts forward in the traveling direction of the steel strip to the angle $\gamma$. Meanwhile, the blade 20 tilts back in the traveling direction of the steel strip to the helix angle $\alpha$ approximate to this forward tilt angle $\gamma$. This makes the blade 20 abut on an edge of the steel strip 50 with a slight backward tilt angle ($\alpha$-$\gamma$) (see FIG. 4). The helical blade cutter C is rotated in the same direction as a traveling direction Y of the steel strip 50. Further, the helical blade cutter C is rotated at a circumferential speed higher than the traveling speed of the steel strip 50. As a result of this difference in speed, the edge of the steel strip 50 is ground.

For cutting, the multiple blades 20 cut into an edge portion of the steel strip 50 sequentially. In the blade 20 cutting into the edge portion, a cutting position moves sequentially. The cutting position moves by an amount differing in a manner that depends on a cutting margin. Further, different cutting chips 21 are used sequentially for the cutting. Thus, temperature increase of the cutting chips 21 is suppressed to make the cutting chips 21 wear uniformly. This forms one of characteristics of the helical blade cutter C. However, if a rapid change in the circumstance of a material is caused, for example, if large camber of the steel strip 50 occurs or the width of the steel strip 50 changes, the edge portion of the steel plate 50 may collide with the cutting chip 21 forming the blade 20. This might damage the cutting chip 21 or the chip holder 30.

If a particular cutting chip 21 is damaged, the chip fixing member 40 ahead of this cutting chip 21 in the rotational direction is detached from the bottom of the blade housing 31 of the chip holder 30 from above or the attachment screw 72 of this chip fixing member 40 is loosened. This forms a condition that allows detachment of the damaged cutting chip 21. Then, the damaged cutting chip 21 is replaced by a new cutting chip 21 and the chip fixing member 40 is screw fixed again to the bottom of the blade housing 31.

Even if the cutting chip 21 is damaged seriously to further damage the blade retainer 34 behind the damaged cutting chip 21, this damage does not extend to the step 14 of the round body 10 behind this blade retainer 34. The reason is that the step 14 is considerably shorter in height than the blade retainer 34. The step 14, even of its short height, is still perpendicular to the blade attachment surface 13 ahead of this step 14 in the rotational direction. This allows this step 14 and this blade attachment surface 13 to work cooperatively to place the holder unit 60 in a given position on the blade attachment surface 13 and retain the holder unit 60 in this position reliably.

If the cutting chip 21 or the chip holder 30 gets a shock of an extent that leads to damage, the short height of the step 14 behind the chip holder 30 in the rotational direction generates a large turning moment on the chip holder 30 acting toward the back of the rotational direction with respect to a corner portion where the back surface and the bottom surface of the chip holder 30 cross each other. This chip holder 30, however, is fixed to the blade attachment surface 13 not only on its opposite sides with the attachment screws 70, 70 but is also fixed with the multiple attachment screws 71 arranged along a line ahead of a line connecting the attachment screws 70. This allows the chip holder 30 to be sufficiently resistant to a large turning moment acting toward the back of the rotational direction.

If the blade retainer 34 of the chip holder 30 is damaged, the damaged blade retainer 34 is exchanged. As a procedure of this exchange, all the cutting chips 21 forming the blade 20 are detached first. More specifically, for detachment of all the cutting chips 21, the corresponding chip fixing members 40 ahead of these cutting chips 21 in the rotational direction are detached by loosening the attachment screws 72 of these chip fixing members 40. Further, the chip-like spacers 22, 22 on the opposite sides of the cutting chips 21 and the corresponding chip fixing members 41, 41 are detached. As a result, the blade housing 31 of the chip holder 30 is exposed. Then, the attachment screws 70 and the attachment screws 71 with which the bottom of the blade housing 31 is fixed to the holder attachment surface 13 are loosened and pulled out. In this way, the chip holder 30 is detached from the blade attachment surface 13 of the round body 10 from above.

After the damaged chip holder 30 is detached, the damaged chip holder 30 is replaced by a new chip holder 30 and the new chip holder 30 is attached to the blade attachment surface 13 of the round body 10 through the method described above. After the chip holder 30 is attached, the blade 20 and the chip-like spacers 22 are assembled into this chip holder 30 using the chip fixing members 40 and the chip fixing members 41 through the method described in detail above.

As described above, in the helical blade cutter of this embodiment, damage to occur on any of the linear blades 20 attached in a tilting posture to the entire outer circumferential surface of the round body 10 does not extend to the round body 10 but it damages only the chip holder 30. Thus, the damage on the blade 20 does not necessitate exchange of the round body 10.

If the blade 20 is damaged or the damage on the blade 20 extends to the chip holder 30, the blade 20 or the blade 20 and the chip holder 30 are exchanged. The blade 20 and the chip holder 30 project from the outer circumferential surface of the round body 10. This facilitates exchange of the blade 20 and the chip holder 30, compared to exchange in the conventional helical blade cutter where corresponding components are attached inside a cut like a slit.

REFERENCE SIGNS LIST

10 Round body
11 Arcuate groove
12 Cut
13 Blade attachment surface
14 Step
15 First screw hole
16 Second screw hole
17 Blade attachment part
18 Holder retainer
20 Blade
21 Cutting chip
22 Chip-like spacer
30 Chip holder
31 Blade housing
31a First layer portion at bottom
31b Second layer portion at bottom
32 First through hole
33 Third screw hole
34 Blade retainer
36 Spacer retainer
37 Screw fixing part
38 Second through hole
40, 41 Chip fixing member
42 Third through hole
50 Steel plate
60 Blade unit
70, 71, 72 Attachment screw
73 Collar
$\alpha$ Helix angle of blade 20
$\beta$ Rake angle of blade 20
$\gamma$ Forward tilt angle of helical blade cutter
O Rotational central axis of round body 10
P Straight line on outer circumferential surface parallel to rotational central axis O of round body 10
R Radial line of round body 10
T Tangent to outer circumferential surface of round body 10

X Rotational direction of round body 10
Y Traveling direction of steel strip 50
C Helical blade cutter
B1 Fixed base
B2 Movable base
M Motor

The invention claimed is:

1. A helical blade cutter comprising at least one linear blade attached to an outer circumferential surface of a round body having an outer surface formed into a cylindrical circumferential surface and rotated in a circumferential direction, the at least one blade being arranged at a given interval in the circumferential direction of the outer circumferential surface, the at least one blade tilting to a given helix angle α from a straight line on the outer circumferential surface parallel to a rotational central axis, wherein
   a blade attachment surface is formed on the outer circumferential surface of the round body, the blade attachment surface tilting to an angle same as the helix angle α of the blade from the straight line on the outer circumferential surface parallel to the rotational central axis while tilting in a direction of an elevation angle from a tangent to the outer circumferential surface, the blade attachment surface being formed through intervention of a step resulting from the tilt in the direction of the elevation angle, and
   the blade is attached to a blade attachment part through intervention of a chip holder in a manner that allows detachment of the blade, the blade attachment part having an L shape in cross section resulting from being surrounded by the blade attachment surface and the step.

2. The helical blade cutter according to claim 1, wherein the chip holder is screw fixed to the blade attachment surface on the outer circumferential surface of the round body at opposite side portions of the chip holder and is screw fixed to the blade attachment surface in a part of the chip holder between the screw-fixed opposite side portions thereof and ahead of a line in a rotational direction connecting the screw-fixed opposite side portions.

3. The helical blade cutter according to claim 1, wherein the height of the step changes continuously from one end side toward an opposite end side in a direction of the rotational central axis in response to the tilt from the straight line on the outer circumferential surface parallel to the rotational central axis of the round body.

4. The helical blade cutter according to claim 1, wherein the blade includes multiple cutting chips arranged in a straight line, and
   the multiple cutting chips are housed in the chip holder fitted to the blade attachment part having the L shape in cross section resulting from being surrounded by the blade attachment surface and the step, the chip holder being screw fixed to the blade attachment surface.

5. The helical blade cutter according to claim 4, wherein each of the multiple cutting chips in the chip holder is fixed in the chip holder with a corresponding wedge-shaped chip fixing member in a manner that allows detachment of the cutting chips, the chip fixing member being screw fixed to the chip holder in a place ahead of a corresponding one of the cutting chips in the rotational direction.

6. The helical blade cutter according to claim 1, wherein the linear blade includes multiple linear blades arranged at the given intervals in the circumferential direction of the outer circumferential surface of the round body.

7. The helical blade cutter according to claim 2, wherein the height of the step changes continuously from one end side toward an opposite end side in a direction of the rotational central axis in response to the tilt from the straight line on the outer circumferential surface parallel to the rotational central axis of the round body.

8. The helical blade cutter according to claim 2, wherein
   the blade includes multiple cutting chips arranged in a straight line, and
   the multiple cutting chips are housed in the chip holder fitted to the blade attachment part having the L shape in cross section resulting from being surrounded by the blade attachment surface and the step, the chip holder being screw fixed to the blade attachment surface.

9. The helical blade cutter according to claim 3, wherein
   the blade includes multiple cutting chips arranged in a straight line, and
   the multiple cutting chips are housed in the chip holder fitted to the blade attachment part having the L shape in cross section resulting from being surrounded by the blade attachment surface and the step, the chip holder being screw fixed to the blade attachment surface.

10. The helical blade cutter according to claim 2, wherein the linear blade includes multiple linear blades arranged at the given intervals in the circumferential direction of the outer circumferential surface of the round body.

11. The helical blade cutter according to claim 3, wherein the linear blade includes multiple linear blades arranged at the given intervals in the circumferential direction of the outer circumferential surface of the round body.

12. The helical blade cutter according to claim 4, wherein the linear blade includes multiple linear blades arranged at the given intervals in the circumferential direction of the outer circumferential surface of the round body.

13. The helical blade cutter according to claim 5, wherein the linear blade includes multiple linear blades arranged at the given intervals in the circumferential direction of the outer circumferential surface of the round body.

* * * * *